(12) United States Patent
Mizell et al.

(10) Patent No.: US 7,246,176 B2
(45) Date of Patent: Jul. 17, 2007

(54) PDP CONTEXT DISTRIBUTION AMONG MULTIPLE GGSNS

(75) Inventors: Jerry Mizell, Plano, TX (US); James Yuhn, Plano, TX (US); Isa Atallah, Addison, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 588 days.

(21) Appl. No.: 10/135,618

(22) Filed: Apr. 30, 2002

(65) Prior Publication Data

US 2003/0204627 A1 Oct. 30, 2003

(51) Int. Cl.
*G06F 15/16* (2006.01)
(52) U.S. Cl. ...................................................... 709/245
(58) Field of Classification Search ................ 370/329, 370/353; 455/432.1–432.3, 433–434; 709/245
See application file for complete search history.

(56) References Cited

U.S. PATENT DOCUMENTS

| 2001/0017850 | A1* | 8/2001 | Kalliokulju et al. | 370/331 |
| 2001/0017856 | A1* | 8/2001 | Asokan et al. | 370/389 |
| 2002/0010683 | A1* | 1/2002 | Aune | 705/67 |
| 2002/0034166 | A1* | 3/2002 | Barany et al. | 370/329 |
| 2002/0080757 | A1* | 6/2002 | Narvanen et al. | 370/338 |
| 2002/0176377 | A1* | 11/2002 | Hamilton | 370/328 |
| 2003/0118010 | A1* | 6/2003 | Ala-Luukko | 370/353 |
| 2003/0169712 | A1* | 9/2003 | Tsao | 370/338 |

FOREIGN PATENT DOCUMENTS

EP 1351528 A1 * 10/2003

OTHER PUBLICATIONS

Shiao-Li Tsao, "Scalable gateway GRPS support node for GPRS/UMTS networks" Sep. 24-28, 2002, Vehicular Technology Conference, 2002, Proceedings. VTC 2002-Fall. 2002 IEEE 56th, vol. 4, Iss., 2002, pp. 2239-2243.*

* cited by examiner

Primary Examiner—Rupal Dharia
Assistant Examiner—Chirag R. Patel
(74) Attorney, Agent, or Firm—Garlick Harrison & Markison; James A. Harrison

(57) ABSTRACT

The previously described shortcomings are solved by a system and method herein that allows for the creation of scaleable wireless data packet networks notwithstanding capacity restrictions of routers used within the network. More specifically, a GGSN is formed to receive an address that is assigned to a different GGSN for support. Stated differently, a GGSN supports an address that is assigned to a different GGSN for support by being responsible for creating a PDP context for that address. Accordingly, because subnet addresses will be assigned to specific GGSNs in one embodiment of the described invention, each GGSN is formed to examine a received address, determine what GGSN is responsible for supporting that address and to forward the address to the responsible GGSN along with an initially requested APN and with vendor specific attributes. The GGSN to which the address is being forwarded is sent to the APN so that it will know the destination network with which the context activation is to be established. The vendor specific attributes are sent so that additional functionality such as billing may be properly performed and implemented. Accordingly, the modified GGSN supports the creation of scaleable networks because each GGSN is able to determine whether an address that it received from a remote DHCP server is one that it can support, and if not, what GGSN is able to support it. Thus, the networks may be grown and/or modified in a scaleable manner while minimizing impact to the existing network elements.

19 Claims, 5 Drawing Sheets

PDP CONTEXT DISTRIBUTION AMONG MULTIPLE GGSNS

BACKGROUND OF THE INVENTION

1. Technical Field

The present invention relates generally to mobile communication systems and, more particularly, to general packet radio services for delivering data over a circuit switched telephone network.

2. Description of the Related Art

A General Packet Radio Service (GPRS) is a non-voice value added service that allows information to be sent and received across a mobile telephone network. It supplements, or rides on top, of today's circuit switched data and short message service W networks. The theoretical maximum speed of GPRS includes speeds of up to approximately 171.2 kilobits per second (kbps). This maximum speed is achievable in GPRS systems using all eight timeslots at the same time in a Time Division Multiple Access (TDMA) context.

This speed is about three times as fast as data transmission speeds possible over today's fixed telecommunication networks and ten times as fast as current circuit switched data services on Global System for Mobile Communications (GSM) standard TDMA networks. Thus, GPRS systems are advantageous in that they require less system resources to transmit a fixed amount of data in comparison to using a traditional circuit switched approach. By allowing information to be transmitted more quickly, immediately, and efficiently, across the mobile network, GPRS may well be a relatively less costly mobile data service compared to Short Message Service (SMS) and circuit switched data services.

GPRS also facilitates instant connections in which information can be sent or received immediately as the need arises, subject to radio coverage. No dial up modem connection is necessary. GPRS, similar to some broadband connections for personal computers, often is referred to as being "always connected". Thus, another one of the advantages of GPRS is that data may be transmitted immediately, whenever the need arises. In contrast to circuit switched data networks in which a connection must be established to transmit a data packet or data file, GPRS operation is extremely efficient in those situations in which a small amount of data is to be sent. As the emphasis of many designs today are to create wireless computer networks, and to connect data devices including personal computers to wireless transceivers and mobile terminals, such a system that provides instantaneous response is very important for time critical applications, and, more generally, for the implementation of wireless computer networks. For example, a remote credit card authorization system implemented in a wireless network can be greatly improved if it is unnecessary for the customer to wait the amount of time that is required to establish a connection. Additionally, GPRS facilitates the use of Internet applications not only from personal computers, but also from appliances and machines. It is anticipated that appliances will be designed to be coupled to the Internet to facilitate control either onsite or remotely. While some people envision connecting these appliances to a network port by physical lines, it would clearly be advantageous to be able to connect such appliances to the Internet through a wireless link. GPRS will facilitate the creation of Internet controlled appliance networks through a wireless medium.

As suggested before, GPRS involves overlaying a packet based air interface on an existing circuit switched wireless network. For example, the circuit switched wireless network may comprise a GSM network. Accordingly, the user is given an option to utilize a packet based data service. In order to overlay a packet based air interface over a circuit switched network, the GPRS standard defines new infrastructure nodes to minimize the impact to existing networks in terms of hardware and software.

One advantage of GPRS is that the packet switching that results from the infrastructure nodes allows the use of GPRS radio resources only when users actually are sending or receiving data. Unlike traditional circuit switched voice networks, a connection is not continuously reserved for a user for the intermittent transmission of data. This efficient use of scarce radio resources means that larger number of GPRS users can share the same bandwidth and be served from a single base station or cell. The actual number of users, of course, that may use the system at one time depends on the amount of data being transferred.

Another delivery network, namely, the Universal Mobile Telecommunications System (UMTS) network, also provides connectionless services. Moreover, GPRS and UMTS support push services. A push service is the delivery of data or multimedia information from a network node to user equipment for the purpose of activating the user equipment or for providing information from the network. A push service also can include activating a Packet Data Protocol (PDP) context, if necessary. Examples of delivery networks that offer push services include, as stated, the GPRS network, but can also include other equipment, such as a session initiation protocol (SIP) proxy, a push proxy or an SMS service center. Push services are expected to be popular because of their ability to deliver advertisements, as well as subscriber ordered upon notice such as traffic conditions, sports scores, stock quotes, etc. New services and features being contemplated require that push capabilities be implemented to enable external Internet protocol networks to deliver data to third generation wireless terminals in the paging system (PS) domain.

Packet domain utilized in GPRS and UMTS system uses a packet-mode technique to transfer high speed and low speed data and signaling in an efficient manner and generally optimizes network and radio resources. Strict separation between the radio subsystems and network subsystems is maintained thereby allowing a network subsystem to be reused with other radio technologies. A common packet domain core network is used for both GSM and UMTS. The common core network provides packet switch services and supports differing quality of service levels to allow efficient transfer of non-continuous bit rate traffic (for example, bursty data transfers).

Some specifications allow operators to provide push services by using static IP addresses or by having long lasting PDP context. However, it would be advantageous to also provide push services within systems that utilize dynamic IP addressing schemes. In other words, push services should be provided to any mobile terminal regardless of whether it has a static or dynamic IP address. In order to use dynamic IP addresses, it is necessary for the network to be able to initiate a PDP context for a mobile subscriber.

In GPRS and UMTS networks, however, a network-initiated PDP context activation is not practical unless a static IP address is allocated for the subscriber in some current systems. The use of static IP address assignments is cumbersome, however, because it wastes available address space for mobile subscribers that are inactive. Thus, it is desirable to initiate PDP context activation with dynamic address assignments. The use of dynamic assignment schemes means that a user's address is not predictable and known to all other systems. Accordingly, specific problems arise when a user wishes to establish a connection with another device without knowing the address of that device. Accordingly, systems are required so that the dynamic address of a terminating device may be ascertained for the creation of a connection or session.

The Access Point Name (APN) is a reference to a specific GGSN that is to be used. Additionally, the access point name may be used to identify the external network and even a service that is to be offered. The access point name typically comprises two portions. A first portion carries the APN network identifier that serves as a label. This APN network identifier is a fully qualified domain name according to DNS naming conventions. In order to guaranty the uniqueness of the APN, the packet domain PLMN allocates, to an ISP or corporation, an APN network identifier identical to their domain name in the public Internet. A second portion of the access point name is the APN operator identifier that is used optionally. It, too, is a fully qualified domain name according to DNS naming conventions.

The APN is an APN network identifier for the selected APN in the Activate PDP Context Request message. The GGSN uses the APN to find an external network and, optionally, to activate a service for the APN. In some embodiment of the invention, the original Activate PDP Context Request message further includes a selection mode which indicates whether a subscribed APN was selected or a non-subscribed APN was selected.

One specific problem is that there is an ever-present need to develop systems whose growth is relatively transparent and painless. Stated differently, there is a large emphasis to develop scaleable networks that may be easily modified to accommodate changes and additions to the network. As designs evolve to create scaleable networks, however, unique challenges exist for inter-network communications that are designed to be scaleable. For example, a first network may attempt to gain access to a second network through a first gateway device to create a connection or data session while the second network, for its own reasons, tends to select a second or different gateway for the connection or data session. In such a case, a conflict exists between the two networks and synchronizing the gateway point of entry and exit for each of the two networks becomes a problem that must be solved.

There is a need, therefore, for a system and method that supports and provides scalability while also enabling separate networks to synchronize the entry and exit gateways so that connections and data sessions may be established.

SUMMARY OF THE INVENTION

The previously described shortcomings are solved by a system and method herein that allows for the creation of scaleable wireless data packet networks notwithstanding capacity restrictions of routers used within the network. More specifically, a GGSN is formed to receive a address that is assigned to a different GGSN for support. Stated differently, a GGSN supports a address by being responsible for creating a PDP context for that address. Accordingly, because subnet addresses will be assigned to specific GGSNs in one embodiment of the described invention, each GGSN is formed to examine a received address, determine what GGSN is responsible for supporting that address and to forward the address to the responsible GGSN along with an initially requested APN and with vendor specific attributes. The GGSN to which the address is being forwarded is sent the APN so that it will know the destination network with which the context activation is to be established. The vendor specific attributes are sent so that additional functionality such as billing may be properly performed and implemented. Accordingly, the modified GGSN supports the creation of scaleable networks because each GGSN is able to determine whether an address that it received from a remote DHCP server is one that it can support, and if not, what GGSN is able to support it. Thus, the networks may be grown and/or modified in a scaleable manner while minimizing impact to the existing network elements.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
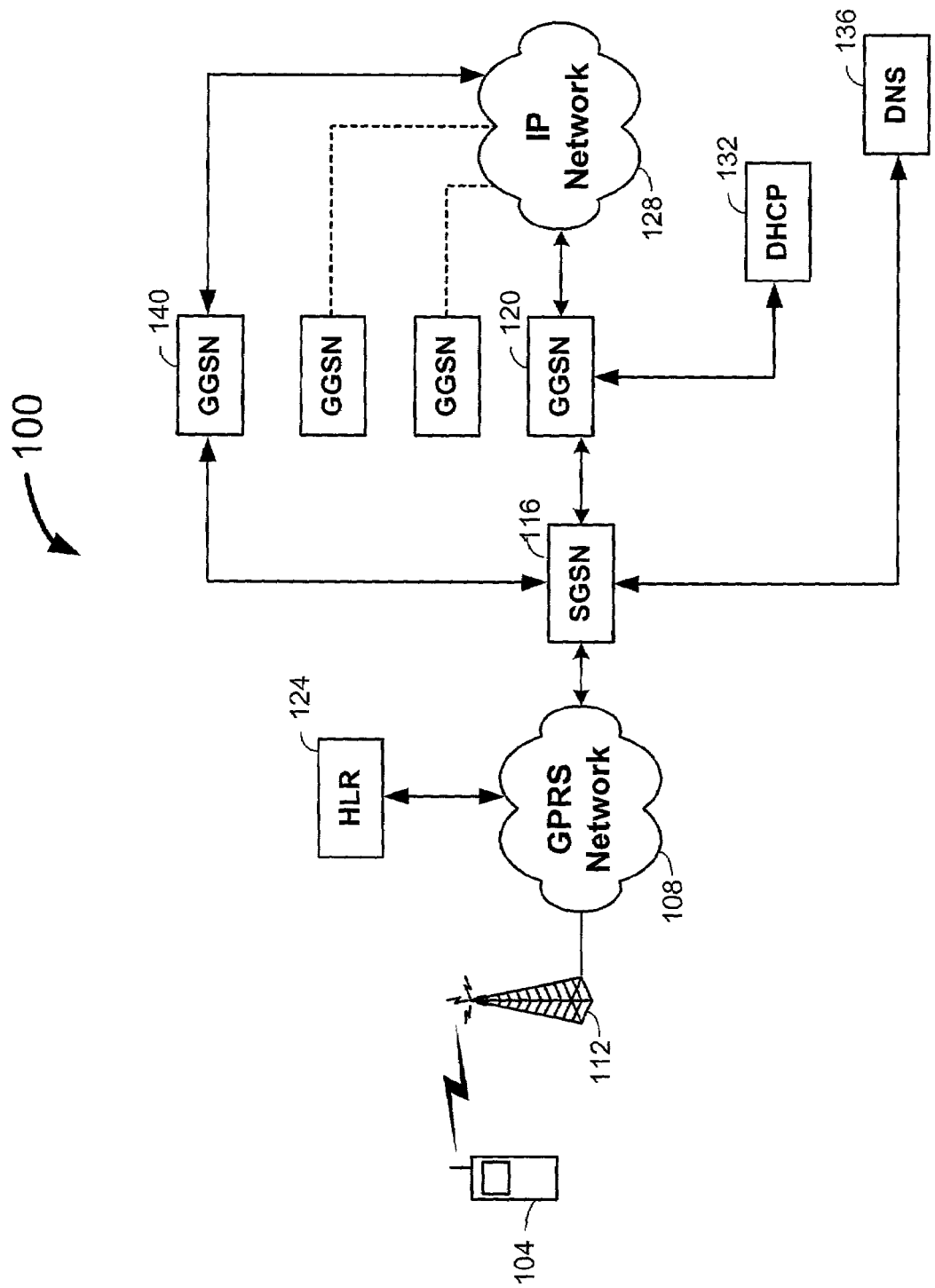
FIG. 1 is a functional block diagram of a communication network formed according to one embodiment of the present invention.

FIG. 1 is a functional block diagram of a communication network formed according to one embodiment of the present invention. The communication network shown generally at 100 includes a mobile node 104 that communicates with radio equipment formed within a GPRS network 108 by way of a tower 112. Mobile node 104 is a GPRS-capable and voice-capable mobile terminal. The GPRS network 108 includes a serving GPRS support node (SGSN) 116 that is operatively coupled to a gateway GPRS support node 120. Additionally, an HLR 124 is coupled to provide subscriber information, and other types of information as necessary, to GGSN 120. An HLR contains subscriber information for both GSM and UMTS networks. An SGSN, such as SGSN 116, is for communicating with a mobile node to initiate a data session or connection through a wireless data packet network. By analogy, the functionality of an SGSN may be compared to that of a base station controller in a voice network. A GGSN, such as GGSN 120, provides a gateway, as its name suggests, from the wireless data packet network to a traditional data packet network such as an IP network. Thus, as maybe seen, GGSN 120 is operatively coupled to IP network 128.

Generally, the SGSN monitors an individual mode location and performs related functions such as access control. The SGSN is connected to the GSN base station through the Gb interface and/or to the UMTS radio access network through the Iu interface. The gateway GPRS support node (GGSN) provides interworking with external packet switch networks that is connected to SGSNs via an IP-based packet domain backbone network. Generally, the GGSN provides an interface between the GPRS network and an external packet network.

User data is transferred transparently between the mobile node and external data networks by encapsulating and tunneling by using encapsulation and tunneling techniques. The data packets are equipped with specific protocol information and are transferred between the mobile node and the GGSN. This transparent transfer method lessens requirement to interpret external data protocols and facilitates introduction of additional interworking protocols.

GGSN 120 further is coupled to a Dynamic Host Configuration Protocol (DHCP) server 132 while SGSN 116 is operatively coupled to a Domain Naming Server (DNS) 136. The DHCP server 132 is a TCP/IP protocol that enables personal computers and workstations to obtain temporary or permanent IP addresses to use for routing communication signals. Typically a DHCP server communicates with the DHCP clients to dynamically assign IP addresses to nodes whenever needed. DHCP supports manual, automatic and dynamic address assignment and provides the client sub-net mask gateway addresses and domain name server addresses. A DHCP server verifies a device identity and "leases" it an IP address on a dynamic basis for use for a specified amount of time. Thereafter, the leased address is reclaimed for reassignment. A DNS includes a plurality of distributed databases that translate computer names to specific IP addresses. A typical DNS server facilitates use of the Internet without requiring memory or one to remember a long list of numbers. Thus, DNS servers and the DNS system make it easy to remember an address of a particular destination.

IP network 128 also is coupled to a plurality of GGSNs, including GGSN 120. GGSN 120 forms the gateway between IP network 128 and GPRS network 116 that is presently serving mobile node 104. Continuing to examine FIG. 1, GGSN 120 also is coupled to an HLR 124. In the diagram shown, other GGSNs are shown within network 100 by way of dashed lines merely to show their presence but that they are not providing any communication support for the present example and, more particularly, for mobile terminal 104. Each of the GGSNs and the HLR 124 are a part of GPRS network 136.

As will be described in greater detail below, the network 100 further includes GGSN 140 that, as described herein, will provide a portion of the actual PDP context meaning that the connection or data session will pass through it. For purposes of clarity, GGSN 120 shall be referenced herein as a Requesting GGSN and GGSN 140 shall be referred to as a context GGSN. In general, Requesting GGSN 120 is the GGSN identified to provide the active context by DNS 136 and is used to initiate the PDP context. Context GGSN 140 actually supports or helps provide the PDP context connection. In operation, whenever mobile node 104 seeks to establish a connection or data session, it generates an Activate PDP Context Request message through tower 112 and GPRS network 108 to SGSN 116. The Activate PDP Context Request message includes an APN.

SGSN 116 then communicates with DNS 136, by sending a query to DNS 136, to identify a GGSN that is to provide the active context. For the example herein, DNS 136 provides an identifier that specifies that GGSN 120 is to support the active context that is being set up. Accordingly, SGSN 116 generates a Create PDP Context Request message to GGSN 120. Here, because the context is being created to a remote network, GGSN 120 generates a query to a remote DHCP server 136 to obtain an address for the PDP context that is being established. Accordingly, GGSN 120 shall be referenced herein as the Requesting GGSN 120.

For the present example, DHCP server 136 returns an address to Requesting GGSN 120 that is not managed or support by Requesting GGSN 120. Accordingly, GGSN 120 is not able to establish the PDP context for mobile node 104. In the described embodiment of the invention, Requesting GGSN 120 performs a database lookup to determine that GGSN 140 is the proper GGSN for the returned address. Accordingly, GGSN 140 shall be referred to herein as the Context GGSN 140 since, for the present example, it will support the active PDP context. Thus, as will be described in greater detail below, Requesting GGSN 120 generates signaling messages to Context GGSN 140, which signaling messages include necessary information for Context GGSN 140 to provide the requested PDP context for mobile node 104.

Figure 2:
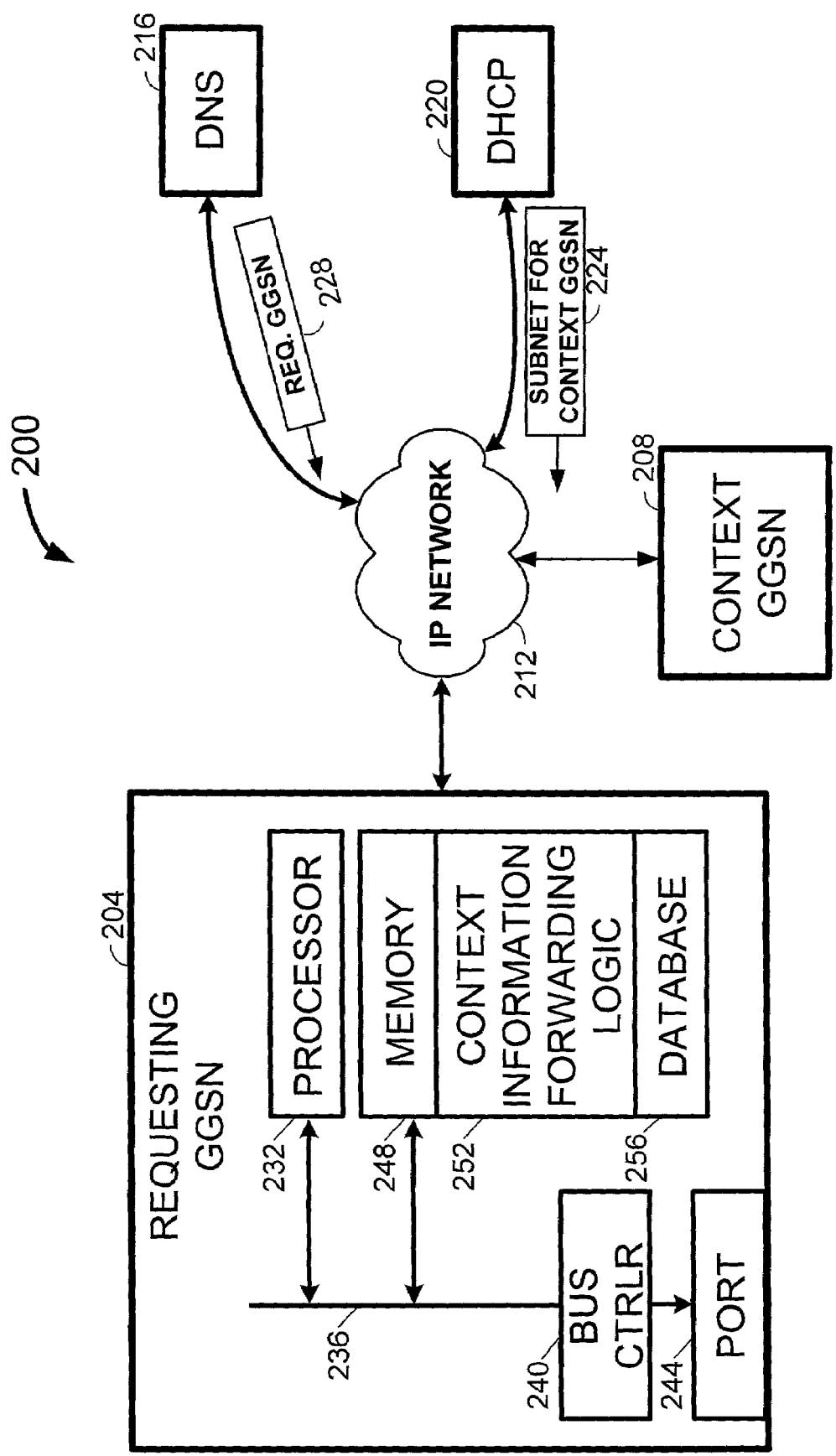
FIG. 2 is a functional block diagram of a GPRS network formed according to one embodiment of the present invention.

FIG. 2 is a functional block diagram of a GPRS network formed according to one embodiment of the present invention. As may be seen, a network 200 comprises a Requesting GGSN 204, a Context GGSN 208 that is operatively coupled to Requesting GGSN 204 by way of IP network 212. Additionally, a DNS server 216 is coupled to IP network 212 as is remote DHCP server 220. Remote DHCP server 220 is for providing an address 224 for a PDP context, which address 224 is for the Context GGSN 208. DNS server 216 is for providing a GGSN ID for creating a context. In the present example, DNS server 216 provides a Requested GGSN ID 228 that correlates to Requesting GGSN 204. As has been described herein, however, Requesting GGSN 204 is not able to provide the active PDP context because it does not manage or have responsibility for the subnet which contains address 224 provided by remote DHCP server 220.

Accordingly, Requesting GGSN 204 is formed to generate signaling to context GGSN 208 to enable it to provide the active PDP context. As will be described in greater detail herein, Requesting GGSN 204 includes the ability to generate signaling to context GGSN 208 that includes an Access Point Name (APN) address, the address 224 provided by remote DHCP server 220, and at least one vendor specific attribute. In one embodiment of the invention, the at least one vendor specific attribute comprises a vendor ID, an address type and an address type value.

Referring more specifically to Requesting GGSN 204, Requesting GGSN 204 includes a processor 232 that is coupled to an internal bus 236 that in turn is coupled to and controlled by a bus controller 240. Bus controller 240 is coupled to a network port 244 through which Requesting GGSN 204 communicates with external devices and networks. A memory 248 further is coupled to bus 236. Memory 248 includes a memory portion 252 that is for storing context information forwarding logic. In operation, processor 232 communicates with memory 248 to retrieve computer instructions within memory portion 252 by way of bus 236, which memory portion 252 includes the computer instructions that define the operational logic for the context information forwarding that is described here in this application. Memory 248 further includes standard operating logic and all operating described here in this application. Accordingly, when processor 232 executes the computer instructions stored within memory 248, the operation of Requesting GGSN 204 is as described herein.

Figure 3:
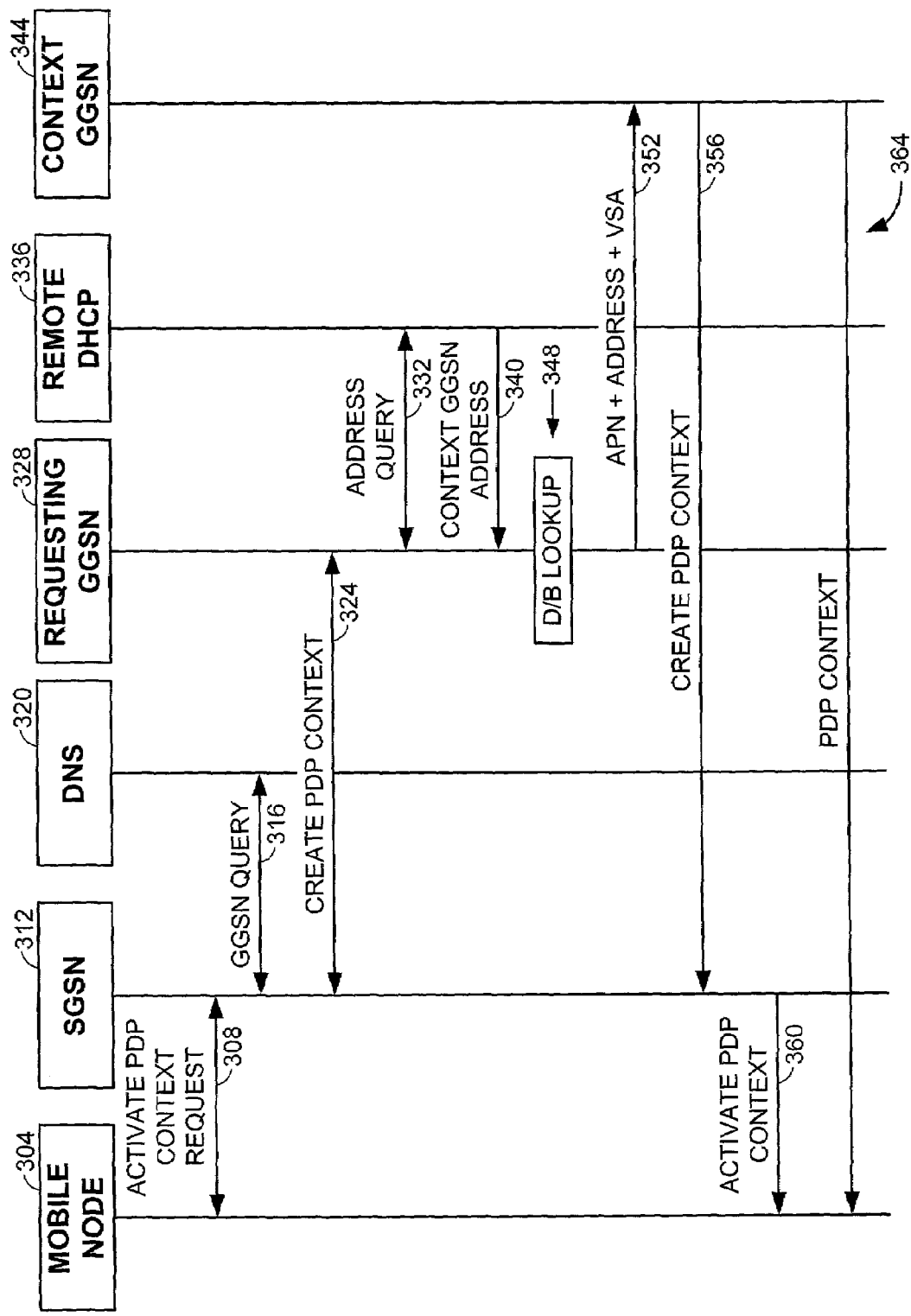
FIG. 3 is a signal sequence diagram that illustrates a method of operation according to one embodiment of the present invention.

FIG. 3 is a signal sequence diagram that illustrates a method of operation according to one embodiment of the present invention. Initially, a mobile node 304 generates an Active PDP Context Request signal 308 that is transmitted to SGSN 312. Responsive thereto, SGSN 312 generates a GGSN query 316 to DNS server 320 to obtain an identity of a GGSN that is to support the PDP context. Accordingly, DNS server 320 replies with a GGSN ID. Responsive thereto, SGSN 312 generates a Create PDP Context signal 324 that it transmits to Requesting GGSN 328 (a Reporting GGSN as the term is used herein for clarifying functional descriptions). Requesting GGSN 328 is a GGSN that corresponds to the ID returned in the query from DNS 320.

Once Requesting GGSN 328 receives the create PDP context message in signal 324 from SGSN 312, it generates an address query 332 that it transmits to a remote DHCP server 336. Address query 332 is to request an address from remote DHCP server 336 for the PDP context that is being established. The address query includes an ID of mobile node 304. In many cases, however, DHCP servers, for their own reasons, will assign the same dynamic IP address to a given user each time a dynamic IP address is requested. For example, reserving a dynamic IP address for a particular user facilitates delivering push messages and creating a context to deliver a push message in a network that utilizes dynamic IP addresses. Accordingly, as networks are being scaled wherein a particular GGSN can only service a group or subnet of IP addresses, remote DHCP server 336 may return a address that does not correspond to the Requesting GGSN 328. More specifically, remote DHCP 336 may return a context GGSN address signal 340 that includes an address that is serviced by the context GGSN 344. Thus, when Requesting GGSN 328 receives the address for context GGSN 344, it realizes that the address is not its own.

Accordingly, Requesting GGSN 328 performs a lookup as shown generally at 348 to determine which GGSN (context GGSN) services the returned address and can support the active PDP context. Upon performing the lookup, the Requesting GGSN 328 is able to identify context GGSN 344 as the one that can support the active PDP context for the address received from the remote DHCP 336. In one embodiment of the invention, Requesting GGSN 328 generates a signal 352 that it transmits to context GGSN 344 to provide necessary information for setting up the active PDP context. In the described embodiment, the necessary information includes an APN, the returned address and vendor specific attributes. Accordingly, with the information received from Requesting GGSN 328 in signal 352, context GGSN 344 is able to generate a Create PDP Context message 356 that it transmits to SGSN 312. SGSN 312, responsive thereto, generates an Active PDP Context message 360 that it transmits to mobile node 304. Thereafter, an Active PDP Context is established between mobile node 304 and a remote network device as shown generally at 364.

Figure 4:
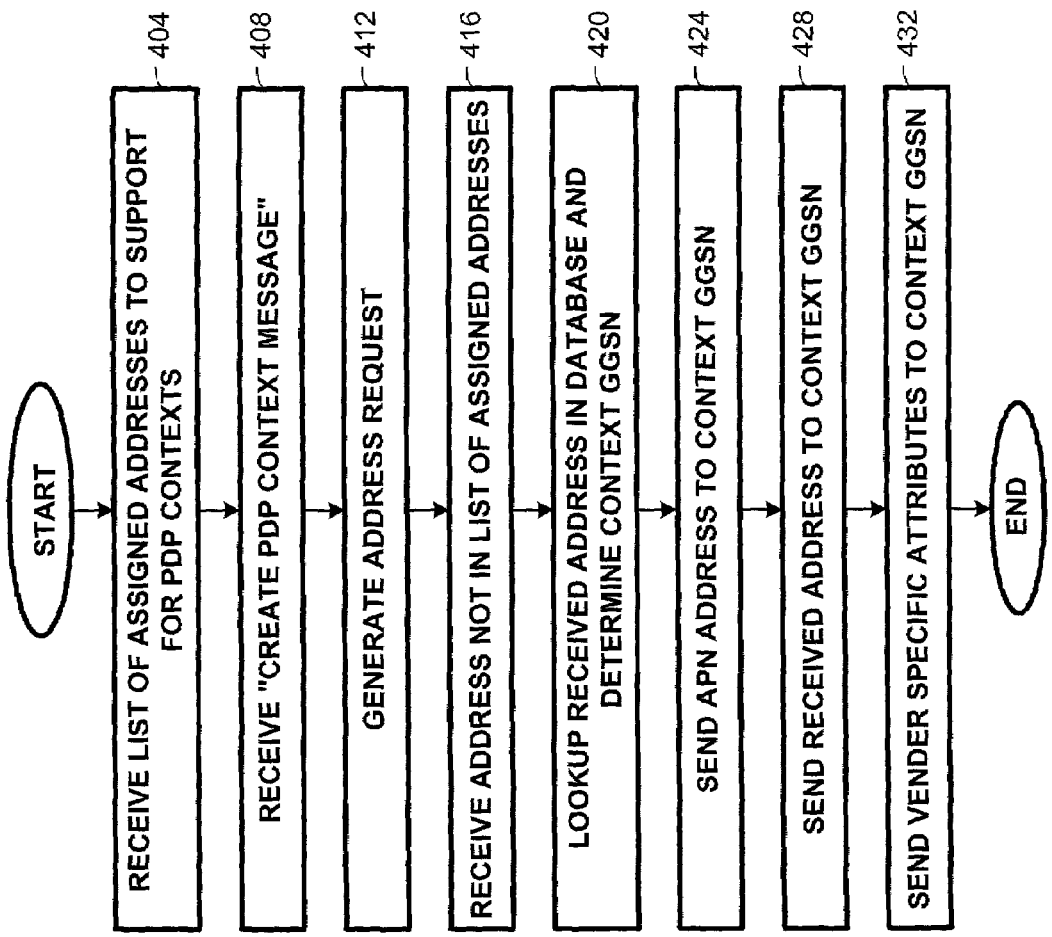
FIG. 4 is a flowchart that illustrates one method for supporting a scaled network design according to one embodiment of the present invention.

FIG. 4 is a flowchart that illustrates one method for supporting a scaled network design according to one embodiment of the present invention. More particularly, the method of FIG. 4 is one that is performed by a GGSN, and more particularly, as disclosed herein, a Requesting GGSN. Initially, the Requesting GGSN receives a list of assigned subnet addresses to support for PDP context. In order to support scaling, each GGSN will provide PDP context for a group of subnet addresses. Accordingly, when the GGSN communicates with a router, the number of addresses that the router is required to support is reduced. Thereafter, the Requesting GGSN receives a Create PDP Context Request message (step 408). The Create PDP Context message is a specific message defined in the GPRS standards that is generated by mobile node as a part of requesting and establishing a PDP context. The Create PDP Context message includes an APN which, generally, defines the remote network device with which a PDP context is to be established. Thereafter, the Requesting GGSN generates an address request to a remote DHCP server (step 412). Thereafter, the Requesting GGSN receives an address that is not in the subnet list (step 416). Accordingly, the Requesting GGSN performs a lookup in a database for the received address to determine a context GGSN (step 420). In the described embodiment of the invention, the Requesting GGSN includes an internal database that maps subnet addresses to context GGSNs. Alternatively, however, one database may be provided external to all of the Requesting GGSNs. In this scenario, performing the lookup to determine the context GGSN for a received address includes communicating with the external device or server or database system that is housing the database to map subnet addresses to context GGSNs. Thereafter, the Requesting GGSN generates and sends the APN address that was originally defined in the Create PDP Context message originated by the mobile node to the context GGSN (step 424). Additionally, the Requesting GGSN sends the received address to the context GGSN, which received address is the one that was received from the remote DHCP server (step 428). Finally, the Requesting GGSN sends vendor specific attributes to the context GGSN (step 432). In the described embodiment of the invention, the vendor specific attributes include a vendor ID, an address assignment type and an address source value. The address assignment type indicates that this information element contains the source of the assigned address. The address source value indicates that the address was assigned by the DHCP server. The purpose of the vendor specific attribute is to provide information to the context GGSN regarding the source of the assigned address so that the source can be properly reflected in the billing records for the PDP context.

Figure 5:
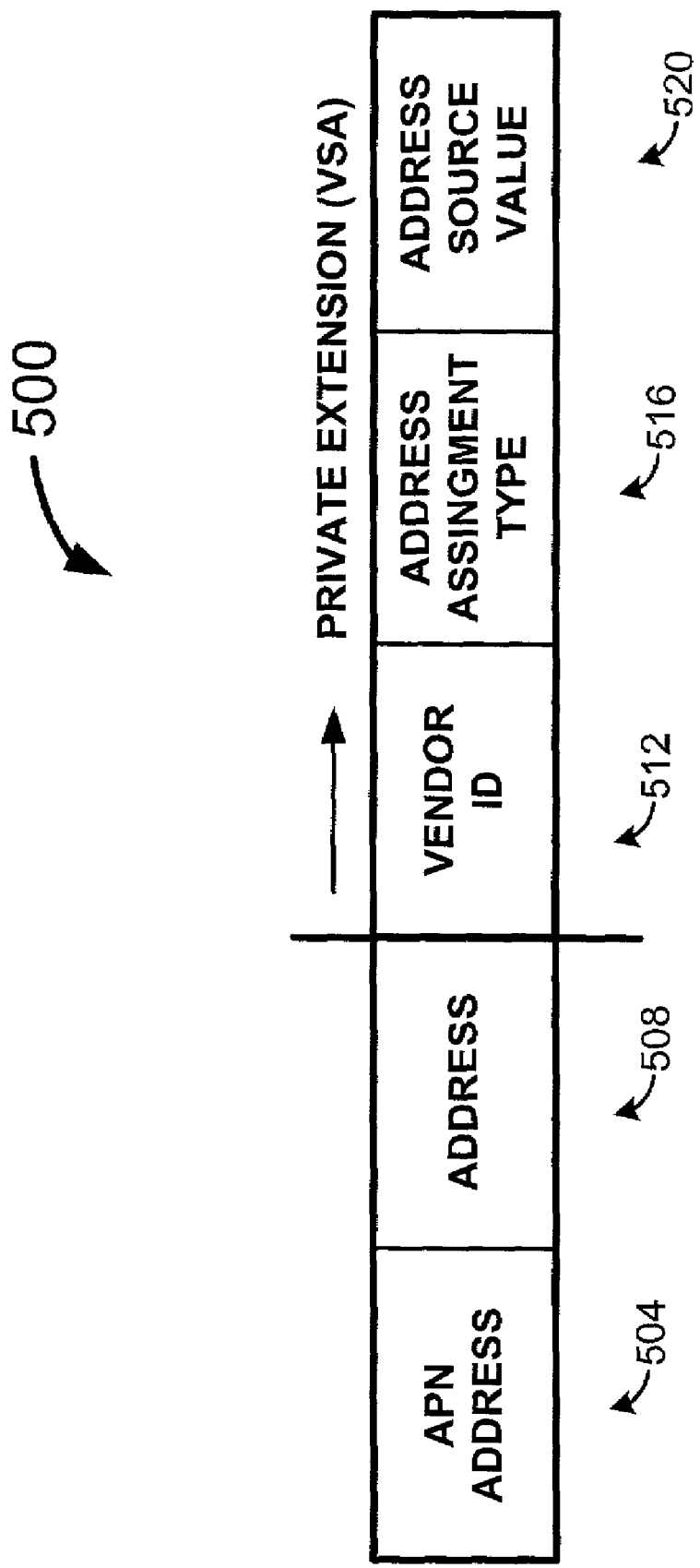
FIG. 5 is a signal diagram that illustrates signal flow according to one embodiment of the present invention.

FIG. 5 is a signal diagram that illustrates signal flow according to one embodiment of the present invention. As may be seen, a signal shown generally at 500 includes an APN address portion 504, a address portion 508, a vendor ID portion 512, an address assignment type portion 516 and an address source value portion 520. More specifically, portion 504 is for carrying the APN address that was originally listed in the Activate PDP Context Request message generated by the mobile node. The portion 508 is for carrying the address that was returned from the remote DHCP server. The three portions 512, 516 and 520 are for carrying a so-called Private Extension, as referred to in GPRS standards and which have been referred to as herein as the Vendor Specific Attributes. Such information is important for billing purposes, among other reasons. In many cases, the remote network and remote DHCP are part of a private network for which access is charged monetarily. Accordingly, the vendor ID, address assignment type and address source value provide important parameters for billing purposes, among other reasons.

In one specific embodiment of the invention, a master GGSN is defined in which all PDP context requests are initially submitted. The master GGSN then performs the steps described herein, namely, retrieving an address from the corresponding DHCP server and forwarding the received address along with other necessary parameters, to an appropriate GGSN for completion of the PDP context activation. In relation to the figures described herein, the master GGSN is a receiving GGSN that receives all PDP context activation requests and includes the logic for properly disseminating the received addresses from the DHCP server. In the originally described embodiment, any and all GGSNs perform to serve the role of a receiving GGSN and the role of a context GGSN. In this embodiment, however, only one GGSN acts as a receiving GGSN, and that is the master GGSN, while other GGSNs act solely as so-called context GGSNs, which means that their function is to support and create the requested PDP context activations.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A Gateway GPRS Support Node ("GGSN"), comprising:
   a processor;
   a bus; and
   a memory operably coupled to the processor via the bus for storing computer instructions defining logic for operating as one of a context GGSN or as a requesting GGSN, wherein the computer instructions cause the processor to:
   when operating as a requesting GGSN, receive a context GGSN address responsive to a query sent to a remote network Dynamic Host Configuration Protocol ("DHCP") server;
   when operating as a requesting GGSN, perform a database lookup to determine what context GGSN is assigned to provide context activation for the received address;
   when operating as a requesting GGSN, forward the address from the Requesting GGSN to the context GGSN; and
   when operating as a context GGSN, receive and process a list of assigned subnet addresses to provide context activation therefore.

2. GGSN of claim 1 wherein the memory further stores computer instructions that cause the processor to generate a signal for transmission to the context GGSN, which signal comprises a portion for carrying an APN address and a portion for carrying a address.

3. The GGSN of claim 2 wherein the memory further stores computer instructions that cause the processor to generate a signal to the context GGSN that includes a private extension that defines at least one vendor attribute.

4. The GGSN of claim 3 wherein the memory further stores computer instructions that cause the processor to generate a signal to the context GGSN wherein the private extension that defines a vendor ID, an address type and an address value.

5. The GGSN of claim 1 wherein the memory further stores computer instructions that cause the processor to determine that a received address from the DHCP server is one that is to be forwarded to another GGSN.

6. A method in a Requesting Gateway GPRS Support Node ("GGSN") for a GPRS/UMTS wireless communications network to service communication connections with a mobile node, the wireless communications network includes a serving GPRS support node ("SGSN"), a Requesting GGSN, a context GGSN, and a domain naming server ("DNS"), the method comprises:
   receiving, from the SGSN, a Create Packet Data Protocol ("PDP") Context Request message;
   sending, in response to the Create PDP Context message, a query to a remote Dynamic Host Configuration Protocol ("DHCP") server;
   receiving, in response to the remote DHCP server query, a DHCP reply including a context GGSN address, wherein the context GGSN address corresponds to a plurality of addresses managed by a context GGSN; and
   forwarding an address of the SGSN and a mobile node ID to the context GGSN.

7. The method of claim 6 wherein forwarding the address of the SGSN and the mobile node ID to the context GGSN further comprises:
   forwarding an Access Point Name ("APN") address provided in the Create PDP Context Request message along with the SGSN address and the mobile node ID to the context GGSN.

8. The method of claim 7 wherein forwarding the address of the SGSN and the mobile node ID to the context GGSN further comprises:
   forwarding vendor specific attributes along with the SGSN address, the mobile node ID, and the APN address to the context GGSN.

9. The method of claim 8 wherein the vendor specific attributes include a vendor ID.

10. The method of claim 8 wherein the vendor specific attributes include an address assignment type.

11. The method of claim 8 wherein the vendor specific attributes include an address source value.

12. A method in a Requesting Gateway GPRS Support Node ("GGSN") for scaling a GPRS/UMTS wireless communications network including a context GGSN, the method comprising:
    sending to the context GGSN a list of assigned subnet addresses to provide context activation therefore;
    receiving, in response to a query to a remote network Dynamic Host Configuration Protocol ("DHCP") server, a context GGSN address;
    performing a database lookup to determine the context GGSN that is assigned to provide context activation for the received context GGSN address; and
    forwarding the context GGSN address to the context GGSN.

13. The method of claim 12 wherein forwarding the context GGSN address includes:
    sending, from a mobile node, an Activate Packet Data Protocol ("PDP") Context Request message to a SGSN to initiate activation of a PDP context;
    sending, from the SGSN, a query to a domain naming server ("DNS") and receiving a GGSN ID;
    sending a Create PDP Context Request message to the Requesting GGSN identified by the GGSN ID;
    sending a query to the remote DHCP server to obtain an address for the PDP context;
    generating, from the context GGSN, a Create PDP Context message to the SGSN; and generating, in response to the Create PDP Context message, an Activate PDP Context Accept message at the SGSN for the mobile node.

14. The method of claim 12 wherein the step of forwarding the address includes transmitting an APN address.

15. The method of claim 13 wherein the APN address is one that was specified by the mobile node that requested a PDP context activation.

16. The method of claim 15 wherein forwarding the address further includes forwarding at least one vendor specific attribute to the context GGSN.

17. The method of claim 16 wherein the at least one vendor specific attribute includes a vendor ID.

18. The method of claim 17 wherein the at least one vendor specific attribute includes an address assignment type.

19. The method of claim 18 wherein the at least one vendor specific attribute includes an address source value.

* * * * *